(12) United States Patent
Hepworth

(10) Patent No.: US 9,189,186 B2
(45) Date of Patent: Nov. 17, 2015

(54) METHOD AND SYSTEM FOR CUSTOM DESIGNING NAIL WRAPS

(71) Applicant: JAMBERRY NAILS, LLC, Lindon, UT (US)

(72) Inventor: Adam Hepworth, Pleasant Grove, UT (US)

(73) Assignee: JAMBERRY NAILS, LLC, Lindon, UT (US)

( * ) Notice: Subject to any disclaimer, the term of this patent is extended or adjusted under 35 U.S.C. 154(b) by 0 days.

(21) Appl. No.: 14/489,807

(22) Filed: Sep. 18, 2014

(65) Prior Publication Data

US 2015/0077770 A1  Mar. 19, 2015

Related U.S. Application Data

(60) Provisional application No. 61/879,456, filed on Sep. 18, 2013.

(51) Int. Cl.

| | |
|---|---|
| G06F 15/00 | (2006.01) |
| G06K 1/00 | (2006.01) |
| H04N 1/00 | (2006.01) |
| G06F 3/12 | (2006.01) |
| A45D 29/00 | (2006.01) |
| G06K 15/02 | (2006.01) |
| A45D 44/00 | (2006.01) |

(52) U.S. Cl.
CPC .............. *G06F 3/1227* (2013.01); *A45D 29/00* (2013.01); *A45D 29/001* (2013.01); *A45D 44/005* (2013.01); *G06F 3/1287* (2013.01); *G06K 15/024* (2013.01); *G06K 15/1836* (2013.01); *A45D 2029/005* (2013.01)

(58) Field of Classification Search
CPC ... G06F 3/1227; G06F 3/1287; G06K 15/024; G06K 15/1836
USPC ......................................... 358/1.6, 1.15, 1.13
See application file for complete search history.

(56) References Cited

U.S. PATENT DOCUMENTS

| | | | |
|---|---|---|---|
| 4,974,610 | A | 12/1990 | Orsini |
| 6,065,969 | A * | 5/2000 | Rifkin et al. .................. 434/100 |
| 6,328,949 | B1 | 12/2001 | Tessarolo |
| 6,336,694 | B1 * | 1/2002 | Ishizaka ........................... 347/2 |
| 6,561,196 | B2 | 5/2003 | Gamburg |
| 7,123,983 | B2 | 10/2006 | Yogo et al. |
| 7,861,730 | B2 | 1/2011 | Jordan |

(Continued)

OTHER PUBLICATIONS

Available at least as early as Jun. 2013 at http://web.archive.org/web/20130622152231/http://www.minxnails.com/customizer.aspx.

*Primary Examiner* — Douglas Tran
(74) *Attorney, Agent, or Firm* — Workman Nydegger

(57) ABSTRACT

A method for generating customer designed nail prints for printing on a computer-controlled printer can comprise transmitting to a remote computer interface at least a portion of a digital nail wrap design studio. The portion of the digital nail wrap design studio can comprise a visual representation of a nail wrap template and one or more design tools. The method can also comprise receiving over a network connection a user generated nail wrap design. Further, the method can comprise generating, from the user generated nail wrap design, a printer file configured to communicate to the computer controlled printer the necessary instructions for printing the user generated nail wrap design onto a nail wrap material.

20 Claims, 5 Drawing Sheets

(56) References Cited

U.S. PATENT DOCUMENTS

| | | |
|---|---|---|
| 2003/0217758 A1 | 11/2003 | Mesirow |
| 2005/0150508 A1 | 7/2005 | Downs et al. |
| 2011/0030712 A1 | 2/2011 | Jordan |
| 2012/0006347 A1 | 1/2012 | Jordan |
| 2013/0106970 A1* | 5/2013 | Yamasaki ..................... 347/110 |

* cited by examiner

METHOD AND SYSTEM FOR CUSTOM DESIGNING NAIL WRAPS

CROSS-REFERENCE TO RELATED APPLICATIONS

This application claims priority to and the benefit of U.S. Provisional Application Ser. No. 61/879,456, entitled "Method and System For Custom Designing Nail Prints", filed on Sep. 18, 2013, which application is incorporated by reference herein in its entirety.

BACKGROUND OF THE INVENTION

1. Technical Field

This invention relates to the field of decorative nail wraps for application on fingernails.

2. Background and Relevant Art

Fingernail polish and artificial fingernails have long been a prominent fashion accessory. Many individuals expend significant time and money decorating and maintaining their fingernails. Some individuals maintain their own fingernails within their home. In other cases, individuals pay a salon to maintain and decorate their fingernails. Oftentimes, the individuals decorate their fingernails to match a particular outfit or to coordinate with a particular event.

Due to the popularity of the fingernail decoration market, there exists a tremendous variety and expanse of fingernail decorations. In some cases, the sheer amount of options may make it difficult for individuals to determine the products that best meet their desires. In particular, the time it can take to sort through such an astounding volume of product may be time prohibitive. Additionally, despite the tremendous number of options available, individuals may wish to further customize the color and decorations that they use on their nails.

In recent years, fingernail applications have become more popular. Fingernail applications comprise synthetic nails, nail wraps, and other plastic-like materials that can be adhered to the surface of a fingernail. Most conventional fingernail applications are sold with decorations applied to the face of the application. Because the decorations are applied during manufacturing, the applications can comprise a level of detail and precision that is generally not available with fingernail polish and hand-painted decorations.

One will understand that finding a particular fingernail color or design to match an outfit or coordinate with an event can be a difficult undertaking In particular, this can be a difficult undertaking when the user wants a particular figure or image for his or her nails. While hundreds of different colors and designs may be available at a department store, a user may want a particular color with a particular design.

Additionally, in some cases, a group of individuals may desire nail decoration uniformity. For example, a group of women may desire to have matching nails for a wedding. It can be a difficult undertaking for all of the women to have matching nails, in particular, if the women do not live near each other. Further, in some cases, the group of women may desire to further customize their individual nails, while remaining within the same nail template. The conventional art makes this process extremely difficult if not impossible due to the tremendous variety of different nail polishes and decorations, not to mention the difference in nail polish application technique.

Accordingly, there are a number of problems in the art relating to providing customers with the particular color and design of fingernails that the customer desires.

BRIEF SUMMARY OF THE INVENTION

Implementations of the present invention comprise systems, methods, and apparatus configured to provide consumers with the ability to custom design nail wraps. In particular, implementations of the present invention comprise one or more computer-executable components or modules that, when executed, enable an individual to apply visual designs to a nail wrap. Further, an individual can apply his or her own images to a nail wrap design. In at least one implementation, the components and modules can be bundled together in one or more server-side or client-side software programs, which can provide an interface for a user to purchase nail wraps comprising the design that the user created.

For example, one implementation of the present invention can include a method for generating customer designed nail prints for printing on a computer-controlled printer. The method can involve transmitting to a remote computer interface a digital nail wrap design studio. The digital nail wrap design studio can display a visual representation of a nail wrap template. Additionally, the digital nail wrap design studio can comprise one or more design tools that are configured to provide a user with the ability to visually design the surface of the nail wrap template. The method can also involve receiving over a network connection a user generated nail wrap design. Further, the method can involve generating, from the user generated nail wrap design, a printer file configured to communicate to the computer controlled printer the necessary instructions for printing the user generated nail wrap design onto a nail wrap material.

In an additional implementation, a method for designing a nail print design can comprise receiving, from a remote computer, a nail print design studio. The method can also involve displaying the nail print design studio. Displaying the nail print design studio can comprise displaying a visual representation of a nail wrap template and displaying one or more design tools. Additionally, the method can involve receiving, from the user, various design customizations for a user generated nail print design. Further, the method can involve generating, from the user generated nail print design, a printer file configured to communicate to the computer controlled printer the necessary instructions for printing the user generated nail print design onto a nail wrap material. Further still, the method can involve transmitting the printer file to the computer-controlled printer for printing.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to provide consumers with the ability to custom design nail wraps. In particular, implementations of the present invention comprise one or more computer-executable components or modules that, when executed, enable an individual to apply visual designs to a nail wrap. Further, an individual can apply his or her own images to a nail wrap design. In at least one implementation, the components and modules can be bundled together in one or more server-side or client-side software programs, which can provide an interface for a user to purchase nail wraps comprising the design that the user created.

Accordingly, one will appreciate that implementations of the present invention can provide an individual with significant control and freedom in designing custom nail wraps. In particular, instead of searching and sorting through a myriad of nail products available at a plurality of stores in search of a particular design, a user can simply design their own nail wraps to fit any occasion or fashion that the user desires. In addition, a user can create a nail wrap that comprises a picture, word, or other design that is personally significant to the creator of the nail design.

Additionally, at least one implementation of the present invention provides a user with a novel method for controlling a nail wrap printer. For example, instead of hoping that conventional nail decorations exist that match a user's tastes, the user can design a custom nail print using personal pictures, colors, and designs that are not available to a professional manufacturer or designer. In at least one implementation, upon creating a custom nail wrap design, a digital printer file can be created that is configured to communicate printing instructions to a printer.

Further, in at least one implementation of the present invention, a user can share a custom design with one or more other individuals. For example, a user may design a particular nail wrap design for a wedding or other celebration. The user can share the nail wrap design with the other individuals, so that the other individuals can also purchase the nail wrap design. Additionally, in contrast to conventional nail wraps that are pre-made and non-adjustable, the other individuals may also be able to adjust and further customize the nail wrap design to their own tastes, while still sharing a uniform nail wrap template. Accordingly, implementations of the present invention provide several novel solutions to overcome problems within the conventional art.

Figure 1:
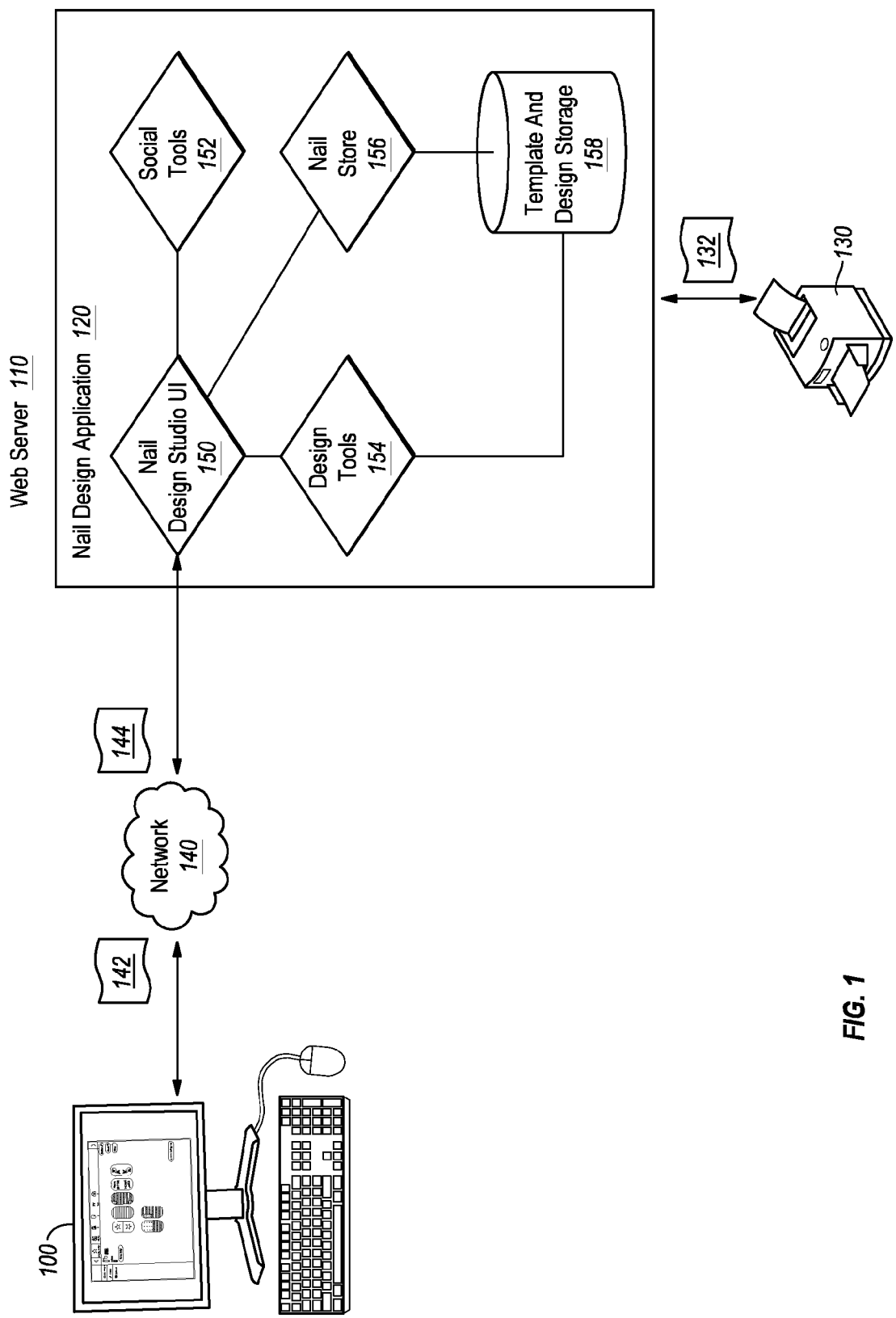
FIG. 1 illustrates a schematic of an implementation of a software application for custom designing nail prints in accordance with the present invention.

For example, FIG. 1 illustrates a client system 100 in communication with a Web server 110 through a network 140. In at least one implementation, the Web server 110 is also in communication with a printer 130. The Web server 110 can further comprise various modules 150, 152, 154, 156, 158 that will be further described below. One will understand, however, that the various components and elements of FIG. 1 are merely exemplary. Alternate embodiments may comprise different components, different configurations of components, and/or different subcomponents for accomplishing the computerized methods and results described herein. The components and elements of FIG. 1 are exemplary and are depicted for the sake of clarity and should not be read to limit the present invention to a particular form or configuration.

FIG. 1 shows that the client system 100 has executed and is displaying a web browser. The web browser may be in communication with Web server 110 through the network 140. In particular, the client system 100 can communicate data packets 142 to the Web server 110. In return, the Web server 110 can communicate information packets 144 back to the client system 100.

In the illustrated example, web server 110 sends data packets associated with nail design application 120. The nail design application 120, in turn, can comprise various modules and components that are configured can provide client system 100 with a nail design studio. For example, the nail design application 120 can comprise a nail design studio UI module 150 that is configured to communicate various data packets 144 to the client system 100. Specifically, the nail design studio UI module 150 can provide a nail design studio user interface that is viewable within a web browser on the client system 100.

In at least one implementation, the nail design user interface provides a user with a variety of different functions for creating custom nail wrap designs. For example, the design tools module 154 can provide functionality for selecting a particular nail wrap color, embellishing a particular nail wrap, drawing on a particular nail wrap, writing text on a particular nail wrap, and other similar decorative functions. In at least one implementation, the design tools module 154 also provides a user access to various nail design templates that are saved within the template and design storage 158. As such, a user can choose a starting template from among a variety of pre-made nail design templates. Accordingly, each of the described functionalities can allow a user to design and customize a nail wrap to an extent previously unattainable in the conventional art.

In addition to providing tools for customizing nail wrap designs, the nail design studio UI module 150 can also provide users with the ability to share a nail wrap design and to purchase nail wrap designs. For example, social tools module 152 may provide a user with the ability to share a user generated nail wrap design with one or more other people. For instance, a user may create a nail wrap design in anticipation for a particular event. The social tools module 152 may allow the user to send the design to a group of friends. The individual friends may then be able to purchase the design or further manipulate and add to the design. In at least one implementation, a user can share a design publicly, such that any user who accesses the nail design application 120 can access the nail design.

A user who creates a design may also be able to place restrictions on the design through the social tools module 152. For example, a user may be able to share a particular design, while at the same time locking it such that other users are not able to manipulate or add to the design. In this way, users can require that their individual designs remain intact. In an alternative implementation, a user created design by default cannot be manipulated by other users. In this implementation, a user may be able to selectively change the default such that all other users or specific other users can adjust the user created design.

Additionally, users of the nail design application 120 may also be able to purchase nail wrap designs from the web server 110. In at least one implementation, the nail store module 156 can provide various functions for receiving orders, processing payments, and preparing orders for shipment. For example, a user may purchase a nail wrap design that was created by the user, or the user may purchase a premade nail wrap design that is stored within the template and design storage 158.

In at least one implementation, a user who creates a design may also be eligible to receive money from the sales of the particular design. For example, the user can share the nail wrap design with friends or with the public in general. As various other people purchase the nail wrap design, the nail store module 156 can track the amount of money made by the sales. In at least one implementation, the user who designed the nail wrap can be compensated a specific amount based upon the sales.

Allowing users to receive compensation for their nail designs can provide significant benefits over the conventional art. For example, implementations of the present invention can provide significant financial incentives to users and professional designers. Conventional nail wraps are created by large companies without input from small or lesser known designers or normal users. In contrast, implementations of the present invention allow any ordinary user or designer who desires to contribute their creativity and design for nail wraps to other users, and to receive compensation for their contributions.

Once a nail wrap design has been ordered, the nail store module 156 can convert the nail wrap design into a printer file 132. In at least one implementation, however, the nail wrap design can be converted as soon as the designer initially saves the design or at any other convenient time. The printer file 132 can then be transmitted to a printer 130 for printing. The printer 130 can comprise a vinyl printer, a laser printer, an inkjet printer, or any other printer capable of printing designs onto non-paper materials. In at least one implementation, the nail wrap designs can be printed onto vinyl nail applications that are affixed to a clear plastic card. The clear plastic card can be beneficial to a user who wishes to see how the nail application would appear on the user's finger. For example, because the card is clear, the user can align the nail application with their finger.

When printing a particular nail wrap design, in at least one implementation, the nail design application 100 can compress the nail wrap design. In particular, a nail wrap design may comprise multiple design layers. Each of these design layers can add significantly to the size of the nail wrap design file. Prior to converting the design file into a printer file, the nail design application 100 can flatten the design file such that the images are compressed into a single layer.

In at least one implementation, the nail store module 156 prints batches of nail wrap designs. For example, the printer 130 may be capable of printing a large number of nail wrap designs at the same time. Accordingly, the nail store module 156 may generate print files 132 in batches such that the maximum number of nail wrap designs are printed at the same time.

Figure 2:
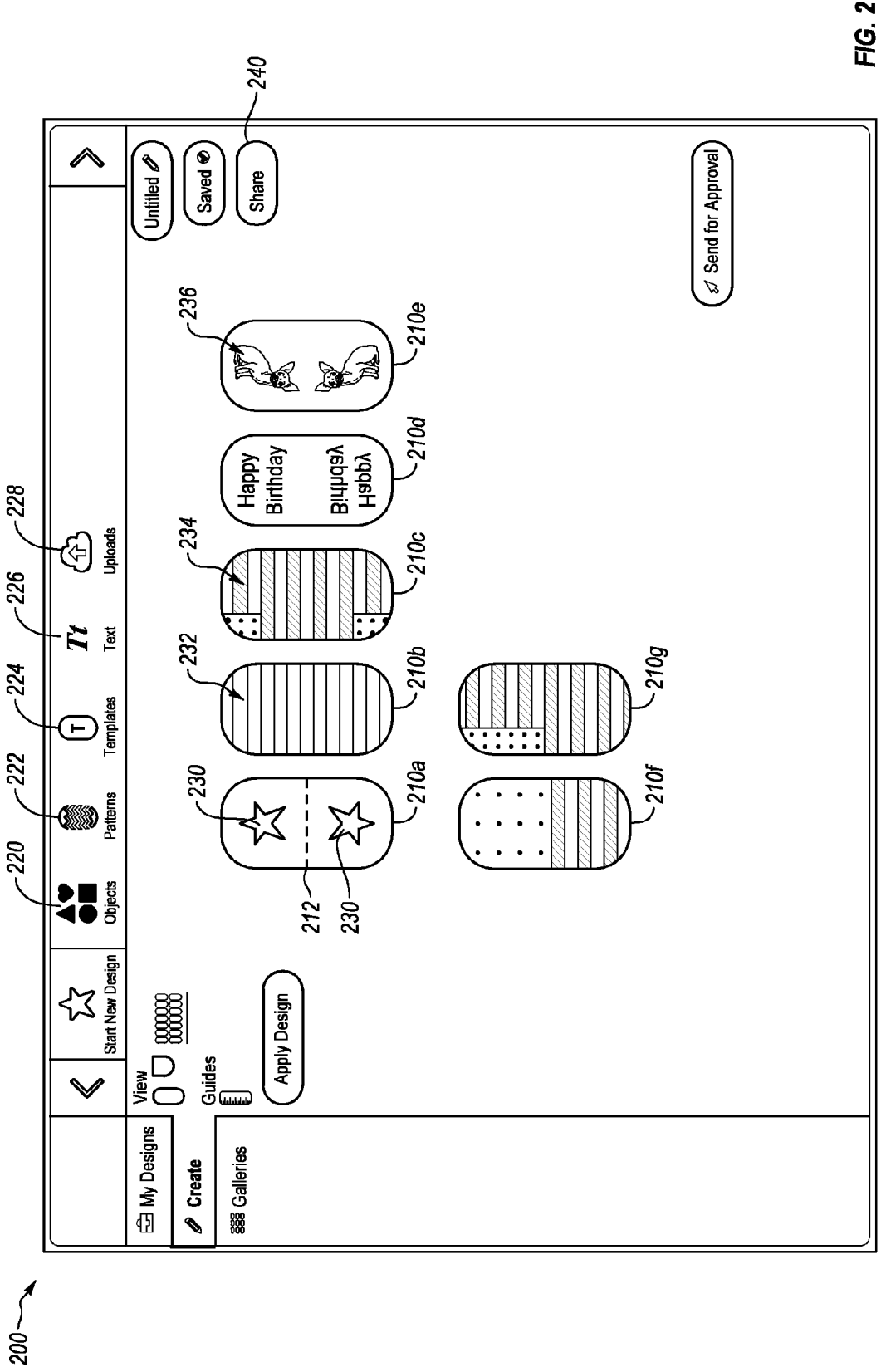
FIG. 2 illustrates an implementation of the software application of FIG. 1 displaying a nail design studio interface.

FIG. 2 depicts an implementation of a nail design studio, such as one displayed through a display interface at a remote client computer system 100. In particular, FIG. 2 shows a create interface 200 that allows a user to create a custom nail wrap design at device 100. In the depicted implementation, the create interface 200 depicts a set of seven nail wrap templates 210(*a-g*). In other implementations, however, the create interface 200 may display a single nail wrap template, two rows of nine nail templates, two rows of eleven nail wrap templates, or any other configuration of nail templates. Further, in at least one implementation, the create interface 200 may depict a nail wrap template that has been virtually cut to fit a typical fingernail. One will appreciate that, however displayed, the nail wrap designs may be printed on cards as two rows of nine nail templates or two rows of eleven nail templates.

In any event, as shown in FIG. 2, one will appreciate that the create interface 200 can provide a variety of different design options. For example, FIG. 2 shows that the create interface 200 can comprise an "objects" menu 220, a "patterns" menu 222, a "templates" menu 224, a "text" menu 226, and an "uploads" menu 228. In additional implementations, the create interface 100 can further comprise additional design features and tools. For example, the create interface 100 can also comprise a menu that allows for free hand drawing on the nail wrap templates using various digital drawing tools.

Returning to FIG. 2, the object menu 220 can provide a user with various decoration embellishments that can be applied to a nail wrap template. In particular, the decoration embellishments can comprise interactive objects 230 that are configured to receive various customizations from a user. For example, FIG. 2 shows that nail wrap template 210*a* comprises a star object 230 from the object menu 220. Being an object, the star object 230 may be resizable using various conventional methods for resizing figures. Additionally, the star object 230 may be configurable to a particular color chosen by the user. Further, the user may be able to position and rotate the star object 230 as desired.

While a star object 230 was used in FIG. 2 to describe a particular design function provided by the create interface 200, one will understand that a wide variety of different types of objects can also be available to a user. For example, a user may be provided with various objects that represent flowers, animals, stars, moons, suns, fish, people, sports, teams, characters, or any other design element. In additional implementations, a user can upload her own customized image. However received or created, one will appreciate that the user can apply the chosen design object to a nail wrap template, and then further adjust various aspects of the object.

FIG. 2 also shows that nail wrap template 210*a* also comprises a template divider line 212. In at least one implementation, when applied to a fingernail. The system can divide the design so that the nail wrap design is cut in half and a top half is applied to a first finger nail and the bottom half is applied to another nail. As such, when designing a nail wrap, a user may design both halves of a nail wrap template such that each half is a design for a single nail wrap. Additionally, in at least one implementation the create interface 200 can comprise a mirror tool that allows a user to design a single side of a nail wrap design and then "mirror" the design to the opposing side. As such, a user can have both sides of a nail wrap design match such that when applied to two fingernails, both fingernails match.

In addition to applying objects to a nail wrap template, in at least one implementation, the patterns menu 222 allows a user to apply a particular pattern to a nail wrap template. For example, nail wrap template 210*b* comprise a horizontal line pattern 232. In at least one implementation, upon applying a pattern 232 to a nail wrap template, a user can specify specific attributes that the pattern should include. Similar to the star object 230, the patterns 232 can also be customized to reflect particular colors, pattern frequencies, pattern sizes, and other similar attributes.

Additionally, in at least one implementation, FIG. 2 shows that the create interface 200 can comprise a template menu 224. The template menu 224 can give a user access to a variety of previously created nail wrap design templates. The previously created nail wrap design templates 234 may comprise nail wrap designs that were created by professional designers, by the selling company, or by other users who chose to share their designs.

FIG. 2 further shows that nail wrap template 210*c* comprises a previously created nail wrap design template 234 that includes an American flag. As described above, the American flag is depicted on opposing ends of the nail wrap template because in use the template is cut in half and applied to two different fingernails.

In at least one implementation, a user can make further adjustments to the previously created nail wrap design template 234. For example, implementations of the present invention allow a user can add an embellishment into the design, remove a portion of the design, change the color of the design, or perform a variety of design functions on the previously created nail wrap design template 234. In contrast, in at least one implementation, templates can be locked such that users can only add to the previously created nail wrap design template 234, but are not able to take portions out or change portions of the design.

FIG. 2 also shows that the create interface 200 can also comprise a text menu 226. The text menu can allow a user to write customized text within a nail wrap template. For example, nail wrap template 210*d* comprises the words "Happy Birthday" written across opposing ends of the nail wrap design. Similar to the design features above, in at least one implementation, a user can customize the font, font color, font size, and letter orientation when writing on a nail wrap template.

The create interface 200 can also include an upload menu 228 that allows a user to upload a personal picture. For example, nail wrap template 210*e* comprises a picture of a dog 236 that a user uploaded and applied to their nail wrap design. In addition to uploading actual image files, in at least one implementation, a user can also upload specific patterns, colors, and nail design templates. As such a user can incorporate design features that exist outside of the create interface 200.

As described above, the create interface 200 can allow a user to design an individual nail wrap template 210(*a-e*). In at least one implementation, the create interface 200 can also allow a user to design multiple nail wrap templates 210(*f-g*) simultaneously. For example, in nail wrap templates 210*f* and 210*g* a user has placed a single image of the American flag over nail wrap templates 210*f* and 210*g*. As depicted, wrap templates 210*f* and 210*g* each comprises a unique portion of the single image. Accordingly, a user can create a nail wrap templates that comprises a single unified image spread between each of the individual nail wraps.

Once a user has finished creating a nail wrap design, implementations of the present invention allow the user to choose to share the design using the share option 240. The share option 240 can give the user the ability to share the design with the public as a whole or the ability to share with a select group of individuals. Additionally, in at least one implementation, the user can determine whether others are allowed to further share the nail wrap design.

Accordingly, implementations of the present invention provide a user interface that allows a user to customize a nail wrap design. In particular, a novel method and system is described that allows a user to customize a fingernail application. One will appreciate that conventional fingernail art is either non-customizable or must be artfully painted on an individual's fingernails.

Figure 3:
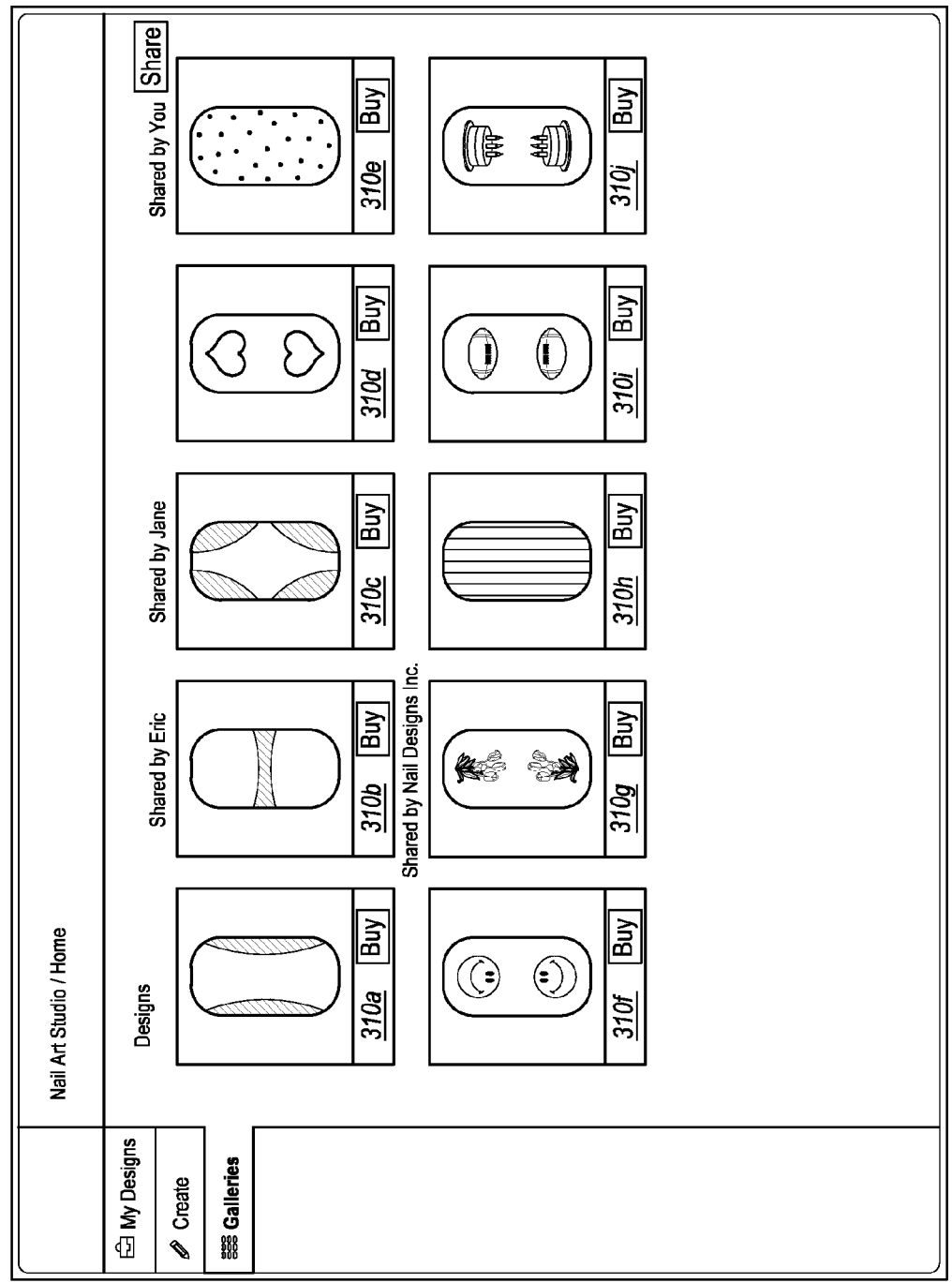
FIG. 3 illustrates an implementation of the software application of FIG. 1 displaying a nail print gallery.

Turning now to FIG. 3, in at least one implementation of the present invention, a nail wrap gallery 300 can provide various options to a user for sharing and buying various nail wrap designs 310(*a-j*). In particular, a user can purchase nail wrap designs that are publicly available for any user to purchase, or the user can purchase non-public nail wrap designs that were either designed by the user or specifically shared with the user. For example, nail wrap designs 310(*a-j*) may all comprise publicly available nail wrap designs. In contrast, nail wrap design 310*b* may have been privately designed by a designer, Eric, and shared specifically with the user. Similarly, nail wrap design 310*c* may be been designed by designer Jane and shared with the public in general. Further, nail wrap design 310*e* may have also been designed by the user, and the user may have chosen to share it with one or more friends, or the public in the general. In this case, both the user and anyone with access to the nail wrap design may be able to purchase the nail wrap design. In at least one implementation, a user shares a nail wrap design by selecting the design and then selecting the share button. Additionally, in at least one implementation, the original designer can also determine whether the user can share the nail wrap design 310*j*, or if the user can only purchase, but not share, the nail wrap design 310*j*.

Accordingly, FIGS. 1-3 depict various implementations of the present invention that are adapted to aid a user in customizing nail print designs. In particular, the present invention provides a user with a framework to have significant control of the design and look of a nail print set. Additionally, the present invention provides a user with the ability to create unique custom nail prints that match a particular outfit or event. One will appreciate that implementations of the present invention can also be described in terms of flowcharts comprising one or more acts for accomplishing a particular result. For example, FIGS. 4 and 5 and the corresponding text describe acts in a method for designing a nail wrap. The acts of FIGS. 4 and 5 are described below with reference to the elements shown in FIGS. 1-3.

Figure 4:
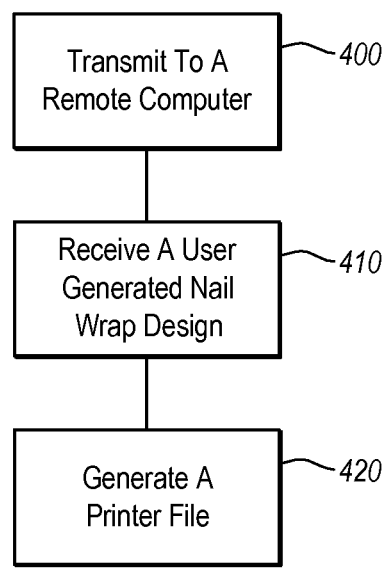
FIG. 4 illustrates a flow chart of a set of acts in a method for designing custom nail wraps.
Figure 5:
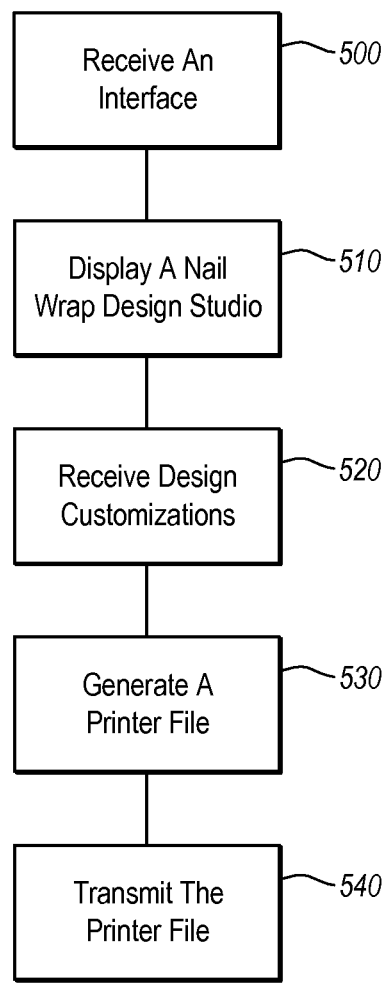
FIG. 5 illustrates a flow chart of a series of acts in an alternative method for designing custom nail wraps.

For example, FIG. 4 illustrates that a method for generating customer designed nail prints for printing on a computer-controlled printer can include an act 400 of transmitting to a remote computer. Act 400 can comprise transmitting to a remote computer interface at least a portion of a digital nail wrap design studio. The portion of the digital nail wrap design studio can comprise a visual representation of a nail wrap template that comprises at least one visual representation of a nail wrap. Additionally, the portion of the digital nail wrap design studio can comprise one or more design tools that are configured to provide a user with the ability to visually design the surface of the nail wrap template.

For example, FIG. 2 depicts a create interface 200 that depicts representations of various nail wrap templates 210(*a-j*). Additionally, the create interface comprises one or more design tools 220, 222, 224, 226, 228 that allow a user to design the visual face of the nail wraps. For example, nail wrap design 210*a* comprises stars, while nail wrap design 210*c* comprises two American flags.

Additionally, FIG. 4 shows that the method can include act 410 of receiving a user generated nail wrap design. Act 410 can comprise receiving over a network connection a user generated nail wrap design. For example, in FIG. 1 the nail design application 120 receives a user's nail wrap design 142 through network 140.

FIG. 4 shows that the method can also include act 420 of generating a printer file. Act 420 can comprise generating, from the user generated nail wrap design, a printer file configured to communicate to the computer controlled printer the necessary instructions for printing the user generated nail wrap design onto a nail wrap material. For example, FIG. 1 shows the nail design application 120 creating a printer file 132 which can communicate to the printer 132 the necessary instructions for creating the user's nail wrap design.

FIG. 5 illustrates that an alternative implementation of a method for designing nail wrap designs can comprise act 500 of receiving an interface. Act 500 can comprise receiving, from a remote computer, an interface comprising at least a portion of a nail print design studio. For example, in FIG. 1, the client system 100 receives interface elements 144 from the nail design studio UI module 150.

Additionally, FIG. 5 shows that the method can comprise act 510 of displaying a nail wrap design studio. Act 510 can comprise displaying a portion of the nail print design studio. Displaying the portion of the nail print design studio can comprise displaying a visual representation of a nail wrap template. Additionally, displaying the portion of the nail print design studio can comprise displaying one or more design tools.

For example, FIG. 2 depicts a create interface 200 that depicts representations of various nail wrap templates 210(a-g). Additionally, the create interface comprises one or more design tools 220, 222, 224, 226, 228 that allow a user to design the visual face of the nail wrap. For example, nail wrap design 210a comprises stars, while nail wrap design 210c comprises two American flags.

FIG. 5 also shows that the method can include an act 520 of receiving design customizations. Act 520 can comprise receiving, from the user, various design customizations for a user generated nail print design. For example, FIG. 2 depicts a create interface 200 that is displayed on a client system 100. In at least one implementation, as the user manipulates a nail wrap design, the client system 100 receives the manipulations from the create interface 200.

Additionally, FIG. 5 shows that the method can comprise an act 530 of generating, from the user generated nail print design, a printer file configured to communicate to the computer controlled printer the necessary instructions for printing the user generated nail print design onto a nail wrap material. For example, FIG. 1 depicts the client system 100 generating a file 142. In at least one implementation, data file 142 can comprise a printer file.

Further, FIG. 5 shows that the method can include an act 540 of transmitting the printer file. Act 540 can comprise transmitting the printer file to the computer-controlled printer for printing. For example, FIG. 1 depicts a printer file 142 being transmitted from the client system to the printer 130, through the network 140 and the web server 110.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a server computer system in a system comprising one or more servers and one or more remote client computer systems, a computerized method for generating customer-designed nail wraps for printing on a computer controlled printer, the method comprising:

transmitting from the server computer system over a network to a remote client computer system one or more signals representing at least a portion of a digital nail wrap design studio, wherein the at least the portion of the digital nail wrap design studio comprises:
 a visual representation of a nail wrap template, wherein the nail wrap template comprises at least one visual representation of a nail wrap; and
 one or more design tools, wherein the one or more design tools are configured to be displayed at a client computer system and to provide a user at the remote client computer system with the ability to visually design the surface of the nail wrap template;

receiving from the remote client computer system over a network connection a user generated nail wrap design; and generating, from the user generated nail wrap design, a printer file configured to communicate to the computer controlled printer the necessary instructions for printing the user generated nail wrap design onto a nail wrap material.

2. The method as recited in claim 1, further comprising transmitting the printer file to the computer controlled printer for printing.

3. The method as recited in claim 2, wherein the computer controlled printer comprises a vinyl printer.

4. The method as recited in claim 2, further comprising printing a plurality of user generated nail wrap designs within a batch.

5. The method as recited in claim 1, wherein generating a printer file comprises compressing multiple layers from the user generated nail wrap design into a single layer.

6. The method as recited in claim 1, further comprising transmitting to the remote computer interface an interface element allowing the user to purchase a nail wrap comprising the user generated nail wrap design.

7. The method as recited in claim 1, further comprising transmitting to the remote computer interface an interface element that displays options for the user to share the user generated nail wrap with one or more other individuals.

8. The method as recited in claim 7, further comprising transmitting to the one or more other individuals one or more interface elements allowing the one or more other individuals to purchase nail wraps comprising the user generated nail wrap design.

9. The method as recited in claim 1, wherein the nail wrap template comprises multiple representations of nail wraps for different fingernails.

10. The method as recited in claim 9, wherein the one or more design tools allows a user to place a single image over the nail template, such that each of the multiple representations of the nail wraps for the different fingernails comprises unique portions of the single image.

11. The method as recited in claim 9, wherein each of the multiple representations of the nail wraps for the different fingernails can be independently designed.

12. A computer system, comprising:
one or more processors;
system memory; and
one or more hardware computer storage media storing computer-executable instructions that, when executed by the one or more processors, cause the computer system to implement a method for generating customer designed nail wraps for printing on a computer controlled printer, the method comprising:
 receiving, from a remote computer, an interface comprising at least a portion of a nail wrap design studio;

displaying the at least the portion of the nail wrap design studio, wherein displaying the at least the portion of the nail wrap design studio comprises:
   displaying a visual representation of a nail wrap template, and displaying one or more design tools;
receiving, from the user, various design customizations for a user generated nail wrap design;
generating, from the user generated nail wrap design, a printer file configured to communicate to the computer controlled printer the necessary instructions for printing the user generated nail wrap design onto a nail wrap material; and
transmitting the printer file to the computer controlled printer for printing.

13. The system as recited in claim 12, further comprising creating a depiction of a nail wrap comprising the user generated nail wrap design.

14. The system as recited in claim 12, wherein the nail wrap template comprises one or more previously designed embellishments.

15. The system as recited in claim 14, further comprising displaying one or more nail wrap designs that were previously created by other designers and subsequently shared with the user, wherein the nail wrap template is selected, by the user, from among the one or more nail wrap designs.

16. The system as recited in claim 15, further comprising:
   receiving from a user an indication to utilize a design tool; and
   in response to the application of the design tool, adjusting the one or more previously designed embellishments.

17. The system as recited in claim 12, further comprising displaying on the interface an interface element that allows the user to purchase a nail wrap comprising the user generated nail wrap design.

18. The system as recited in claim 12, further comprising displaying on the interface an interface element that allows the user to share the user generated nail wrap with one or more other individuals.

19. The system as recited in claim 18, further comprising transmitting information to the one or more other individuals, wherein the information allows the one or more other individuals to purchase nail wraps comprising the user generated nail wrap design.

20. A computer system, comprising:
   one or more processors;
   system memory; and
   one or more hardware computer storage media storing computer-executable instructions that, when executed by the one or more processors, cause the computer system to implement a method for generating customer designed nail wraps for printing on a computer controlled printer, the method comprising:
      displaying at least the portion of a nail wrap design studio, wherein displaying the at least the portion of the nail wrap design studio comprises:
         displaying a visual representation of a nail wrap template, and displaying one or more design tools;
      receiving, from the user, various design customizations for a user generated nail wrap design; and
      generating, from the user generated nail wrap design, a printer file configured to communicate to the computer controlled printer the necessary instructions for printing the user generated nail wrap design onto a nail wrap material.

\* \* \* \* \*